US011347192B2

(12) United States Patent
Caicedo Fernandez et al.

(10) Patent No.: US 11,347,192 B2
(45) Date of Patent: May 31, 2022

(54) COMMISSIONING OF A SENSOR SYSTEM

(71) Applicant: SIGNIFY HOLDING B.V., Eindhoven (NL)

(72) Inventors: David Ricardo Caicedo Fernandez, Eindhoven (NL); Ashish Vijay Pandharipande, Eindhoven (NL); Roger Peter Anna Delnoij, Lommel (BE); Marco Haverlag, Mierlo (NL); Peter Deixler, Valenswaard (NL); Hugo Jose Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 446 days.

(21) Appl. No.: 15/772,100

(22) PCT Filed: Oct. 14, 2016

(86) PCT No.: PCT/EP2016/074699
§ 371 (c)(1),
(2) Date: Apr. 30, 2018

(87) PCT Pub. No.: WO2017/071969
PCT Pub. Date: May 4, 2017

(65) Prior Publication Data
US 2018/0321645 A1 Nov. 8, 2018

(30) Foreign Application Priority Data
Oct. 30, 2015 (EP) .................................... 15192249

(51) Int. Cl.
*H05B 41/36* (2006.01)
*H05B 47/175* (2020.01)
(Continued)

(52) U.S. Cl.
CPC ............. *G05B 15/02* (2013.01); *G05B 19/02* (2013.01); *G06V 10/98* (2022.01);
(Continued)

(58) Field of Classification Search
CPC ........ G08B 7/062; G06Q 30/02; H05B 47/10; H05B 47/105
See application file for complete search history.

(56) References Cited

U.S. PATENT DOCUMENTS 6,970,183 B1 * 11/2005 Monroe ................. G08B 7/062
348/143
7,502,068 B2 * 3/2009 Narayanaswami ..........................
G01N 21/8803
348/125
(Continued)

FOREIGN PATENT DOCUMENTS

CN 2497276 Y 6/2002
CN 101526552 A 9/2009
(Continued)

OTHER PUBLICATIONS

A building maintenance and surveillance system based on autonomous robots; Lopez; 2014; (Year: 2014).*
(Continued)

Primary Examiner — Luis Perez-Fuentes
(74) Attorney, Agent, or Firm — Daniel J. Piotrowski

(57) ABSTRACT

The invention relates to detecting commissioning errors in a commissioned sensor system, wherein the sensor system comprises a plurality of sensor devices installed so as to cover an area. The sensor devices capture sensor data from the area whilst at least one entity moves through the area. A computer system of the sensor system processes the sensor data to generate a set of location data, which identifies locations traversed by the at least one moving entity. A discrepancy in the set of location data in detected, the
(Continued)

discrepancy caused by at least one of the sensor devices having been incorrectly commissioned. Based on this detection, a modification can be made to the sensor system to compensate for or correct the incorrect commissioning of the at least one sensor device.

16 Claims, 8 Drawing Sheets

(51) Int. Cl.
    *G05B 15/02*     (2006.01)
    *G06V 10/98*     (2022.01)
    *G05B 19/02*     (2006.01)
    *G06K 9/62*     (2022.01)

(52) U.S. Cl.
    CPC ............ *G05B 2219/25068* (2013.01); *G05B 2219/2642* (2013.01); *G06K 9/6288* (2013.01)

(56) References Cited

U.S. PATENT DOCUMENTS

| | | | | |
|---|---|---|---|---|
| 7,663,502 | B2* | 2/2010 | Breed | G01S 17/04 340/12.25 |
| 8,452,868 | B2* | 5/2013 | Shafer | G08B 13/2402 709/224 |
| 8,729,835 | B2* | 5/2014 | Henig | H05B 47/18 315/363 |
| 8,751,154 | B2 | 6/2014 | Wen et al. | |
| 9,585,228 | B2* | 2/2017 | Patel | G01S 5/16 |
| 10,134,064 | B2* | 11/2018 | Sallee | G06Q 30/0643 |
| 2004/0153270 | A1* | 8/2004 | Yamashita | G01N 33/383 702/81 |
| 2008/0218087 | A1* | 9/2008 | Crouse | H05B 47/175 315/131 |
| 2010/0103266 | A1 | 4/2010 | Merkel et al. | |
| 2012/0020518 | A1 | 1/2012 | Taguchi | |
| 2014/0175990 | A1* | 6/2014 | Bhatkar | H05B 47/175 315/154 |
| 2014/0235269 | A1 | 8/2014 | Ericsson et al. | |
| 2014/0265879 | A1 | 9/2014 | Dillen | |
| 2014/0327780 | A1* | 11/2014 | Herrli Anderegg | G08B 13/19645 348/159 |
| 2014/0354831 | A1 | 12/2014 | Sheikh et al. | |
| 2015/0178571 | A1 | 6/2015 | Zhang et al. | |
| 2015/0220428 | A1* | 8/2015 | Simonyi | G06F 12/0207 340/2.26 |
| 2016/0095188 | A1* | 3/2016 | Verberkt | H05B 47/115 315/151 |
| 2017/0105129 | A1* | 4/2017 | Teplin | H04L 41/0806 |
| 2018/0212793 | A1* | 7/2018 | Burger | H05B 47/19 |
| 2018/0321645 | A1* | 11/2018 | Caicedo Fernandez | G05B 19/02 |

FOREIGN PATENT DOCUMENTS

| | | |
|---|---|---|
| CN | 103063250 A | 4/2013 |
| WO | 2015039035 A1 | 3/2015 |

OTHER PUBLICATIONS

Automated Calibration of a Camera Sensor Network; Rekleitis; 2005; (Year: 2005).*
NPL Google search; 2020. (Year: 2020).*
A building maintenance and surveillance system based on robots; Lopez; 2014. (Year: 2014).*
Design and implementation of IEEE 802.15.7 VLC PHY-I Transceiver; Che; 2014. (Year: 2014).*

* cited by examiner

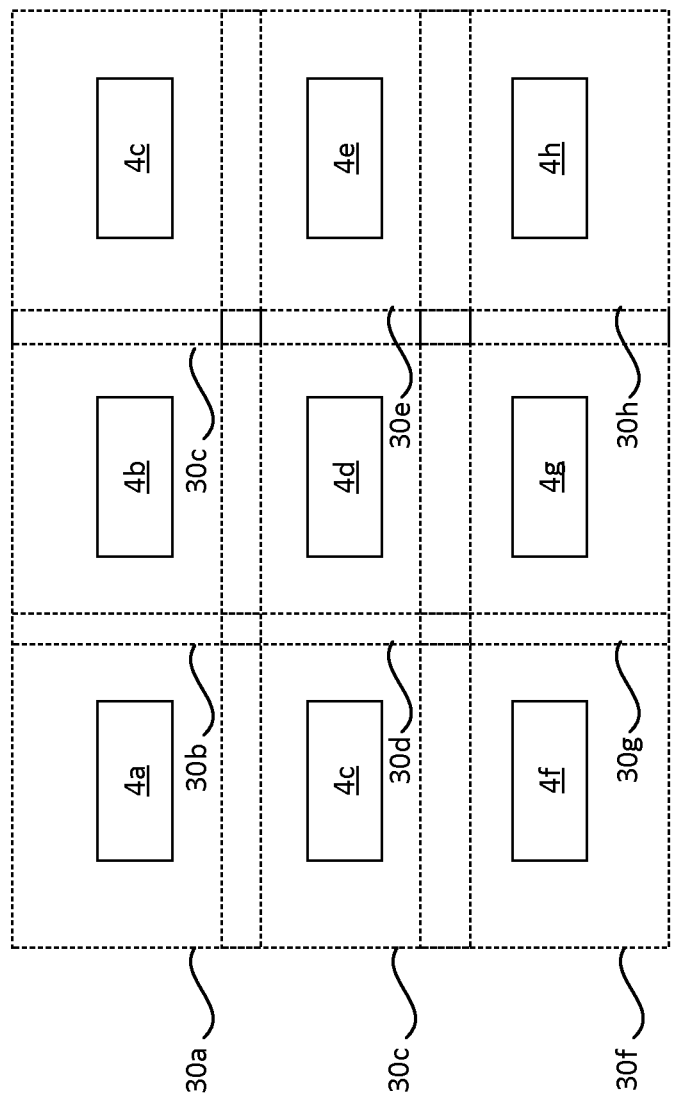

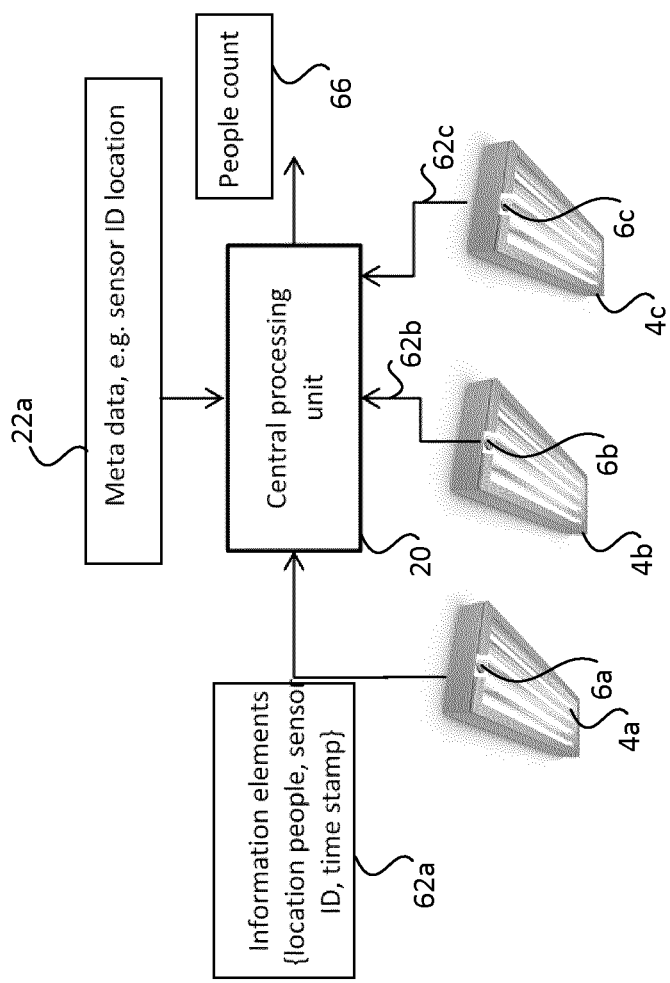

COMMISSIONING OF A SENSOR SYSTEM

CROSS-REFERENCE TO PRIOR APPLICATIONS

This application is the U.S. National Phase application under 35 U.S.C. § 371 of International Application No. PCT/EP2016/074699, filed on Oct. 14, 2016 which claims the benefit of European Patent Application No. 15192249.9, filed on Oct. 30, 2015. These applications are hereby incorporated by reference herein.

TECHNICAL FIELD

The present invention relates to the detection of commissioning errors in a commissioned sensor system.

BACKGROUND

A sensor system may comprise a plurality of sensors arranged to provide coverage of a sensor area. For example, in a lighting system comprising a plurality of luminaires, a sensor may be integrated in or otherwise collocated with each luminaire.

In the context of a sensor system, "commissioning" refers to an initial process, by which the sensor system is made operational, so that it can perform its intended function. The commissioning phase includes both the physical installation of the sensor system, which may for example include mounting or otherwise placing the sensors, wiring, physical adjustments to the sensors etc., as well as any configuration of the sensors, for example the configuring of associated software, of an associated database etc. For example, each sensor may be associated with a device identifier (ID). The device ID may for example be or comprise a sensor ID uniquely identifying that sensor and/or a luminaire ID identifying the luminaire with which it is collocated (where applicable). In order to provide, say, location services, each of the device IDs may be associated with a location identifier identify its location in a database—in this case, populating the database with the location IDs is considered part of the commissioning phase of the sensor system.

From US patent application US2014/0235269 A1, a method is known of commissioning sensors within an area. To this end the method proposes to track a location of a computing device within an area and couple the computing device with a least one of a plurality of sensor units. Next the computing device identifies and records a location of the at least one of the plurality of sensor units based on a tracked location of the computing device and an identifier of the at least one of the plurality of sensor units.

A sensor system may be large and complex, for example with hundreds or even thousands of sensors. Particularly in large systems, the commissioning phase is error prone, not least because mush if not all of it is essentially a manual process. Commissioning errors can arise in a number of ways, for example due to incorrect placement of the sensor during installation, or (where applicable) due to errors in populating the database with location information. Moreover, existing mechanisms for detecting commissioning errors generally rely on essentially manual checks to be performed, for example by checking each sensor individually, such that the checking process is itself error prone.

SUMMARY

The present invention relates to the detection of commissioning errors using data collected over time (i.e. historical sensor data) from sensors, which may for example be image capturing devices—also referred to herein as "vision sensors"—or other sensor devices, such as e.g. radar, sonar, or ultrasound sensor devices. The historical data is in the form of a set of location data, collected over an interval of time during at least one moving entity moves though the area covered by the sensors.

A first aspect of the present invention is directed to a method of detecting commissioning errors in a commissioned sensor system, wherein the sensor system comprises a plurality of sensor devices installed so as to cover an area, the method comprising the following steps: capturing, by the sensor devices, sensor data from the area whilst at least one entity moves through the area; processing, by a computer system of the sensor system the sensor data to generate a set of location data, which identifies locations traversed by the at least one moving entity; detecting in the set of location data a discrepancy caused by at least one of the sensor devices having been incorrectly commissioned; and based on the detecting step, making a modification to the sensor system to compensate for or correct the incorrect commissioning of the at least one sensor device.

That is, the discrepancy is not detected from the sensor data (e.g. images) directly. Rather, it is detected using location data extracted from the sensor data (e.g. images), which can be represented using fewer bits than the sensor data (e.g. image data) from which it has been extracted, due to its lower information content. This allows memory and bandwidth to be saved, as the sensor data (e.g. image data) does not need to be stored or transmitted once the location data has been extracted. That is, memory and bandwidth can be saved as (superfluous) information can be discarded from the sensor data (e.g. image data) in generating the location data, such that only the relevant location information is extracted from the sensor data (e.g. images). This also provides additional privacy for any people present in the images, particularly where the sensor data is image data of images captured by the sensor devices, which may be image capturing devices.

In preferred embodiments, the sensor devices are image capturing devices, which capture images data from the area whilst the at least one entity moves through the area. That is, the sensor data from which the location data is generated may be image data captured from the area by the image capturing devices whilst the at least one entity moves through the area. In other words, the sensor data may be image data of images of the area captured by the image capturing devices.

At least one of the image capturing devices may comprise a visible-light camera and/or at least one of the image capturing devices may comprise a thermal imaging sensor (e.g. a thermopile array or a microbolometer).

However, the sensor devices can take other forms such as e.g. radar, sonar, or ultrasound devices, which generate sensor data in the form of radar data, sonar data and ultrasound data respectively.

In embodiments, the set of location data may, for example, be a set of location vectors (two or three dimensional location vectors) in a global frame of reference i.e. relative to a common spatial origin.

Commissioning errors may, were they are not properly corrected or accounted for, lead to application errors, for example higher-level application errors or erratic behaviour of the system.

For example, in certain embodiments of the present invention the sensor system may be used to perform people counting. That is, to estimate the total number of people in the area, based on the location information extracted from the sensor data (e.g. images).

As an example, in the described embodiments of the present invention, the sensor system is a connected lighting system comprising: vision sensors, a central processor configured to generate a people count (denoting an estimated total number of people in the area) based on location data extracted/generated by processing images captured by the vision sensors, and to provide data-enabled applications based on the people count. In such a system, errors in sensor commissioning due to misplacement of sensors or other commissioning errors can lead to higher-level application errors or erratic behaviour of the system.

The people count can, in turn, be used to provide data-enabled applications based on people counting. The inventors of the present invention have appreciated that commissioning errors, if not properly corrected or accounted for can lead to errors, e.g. errors in estimated number of people over a particular space or location of point of interest such as desks, at a higher system level when the system is used for people counting. This, in turn, can lead to undesired behaviour of any applications that rely on the people count.

In embodiments, the method may comprise: processing, by each of a plurality of local processors (e.g. image processors) of the computer system, each of which is local to a respective one of the sensor (e.g. image capture) devices, sensor data (e.g. image data) captured by that device to generate an individual set of location data identifying locations traversed by the at least one entity within that devices field of view; and communicating, by each local processor (e.g. local image processor), its individual set of location data to a central processor of the computer system, wherein the sensor (e.g. image) data used to generate that set is not communicated to the central processor, wherein the central processor aggregates the individual sets of location data received from the local processors (e.g. local image processors) to generate the set of location data used to detect the discrepancy.

For example, in embodiments, the individual set of location data captured by each sensor (e.g. image capture) device may be a set of one or more location vectors (two or three dimensional) relative to that device. More generally, the individual sets of location data may be expressed in different frames of reference i.e. relative to different spatial origins. Aggregating the individual set of location data may comprise applying a spatial transformation (e.g. translational and/or rotational a transformation) to at least one of the individual sets, such that the location vectors in the set of location data are all in the global frame of reference i.e. relative to the common spatial origin.

This saves bandwidth and also ensures that privacy is maintained for any people in the fields of view of the sensor (e.g. image capture) devices.

The detecting step may be performed by the computer system applying a path detection algorithm to the set of location data. That is, a computer-implemented path detection algorithm may be implemented by executing code embodying the algorithm on a processor of the computer system.

Alternatively, the method may comprise controlling, by the computer system, a display to display to a user a visual representation of the set of location data, wherein the detecting step may be performed by the user, using the displayed representation.

In the described embodiments, commissioning errors are detected errors using (i) location data generated by a commissioner or robot performing a walk test (first described embodiment) or (ii) user trajectories across sensor boundaries and/or patterns in a histogram of the location data (second described embodiment).

In the first of the described embodiments, each sensor device is an image capturing device (vision sensor) connected to a respective processor local to that device and:
  i. Each local processor processes images captured by its vision sensor device, to extract the location of any person in the images;
  ii. Each local processor communicates to a central processor the location of each person, along with a vision sensor identifier (ID) and a time stamp (e.g. counter);
  iii. A commissioner performs a walk test (that is, a walk across a room or other area following a pre-defined trajectory) when he/she is the only one present over the space. Alternately, a robot is made to follow a defined trajectory in a similar manner, in a configuration detectable by the vision sensor.
  iv. The central processor presents a compilation of the trajectory of the commissioner over the space;
  v. The commissioner or a path detection algorithm executed on the central processor detects any discrepancy or discrepancies between the reported trajectory and an expected trajectory.

The images of the area (or other sensor data) may be captured over an interval of time during which multiple people move through the area, wherein the set of location data may identify locations in the area traversed by the people.

The method may comprise generating, by the computer system, for each of a plurality of the locations traversed by the multiple people, an associated value that conveys a relative frequency at which that location has been traversed in the time interval, wherein the frequency values may be used to detect the discrepancy.

For example the visual representation may visually convey to the user information about the frequency values associated with the plurality of locations, e.g. using colour (chrominance, and/or luminance) and/or shading etc. to convey this information. Alternatively, only those locations that have been traversed with relative frequencies above a threshold may be displayed. The visual representation may for example be overlaid on a displayed map of the area, to allow the detection of discrepancies such as paths that appear to pass through walls etc.

In the second of the described embodiments, each sensor device is an image capturing device (vision sensor) connected to a respective processor local to that device and:
  i. Each local processor processes images captured by its vision sensor device, to extract the location of any person in the images;
  ii. Each local processor communicates to a central processor: the location of each person (and size of motion), along with the vision sensor ID and a time stamp (e.g. counter);
  iii. The central processor collects the location information from all the vision sensors over a long duration of time (e.g. several hours or, preferably, at least one day);
  iv. The central processing unit builds a heat-map (or other visual representation) of locations that correspond to motion above a certain threshold;
  v. An administrator or a path detection algorithm executed on the central processor detects discrepancy between the heat-map of locations and expected valid locations.

An invalid trajectory of locations may indicate an error in the configuration (e.g. trajectories that cross through a wall are invalid).

The at least one entity may be a user or a robot. The robot may determine a path through the area in an automated way (e.g. following beacons, internal accelerometers, or some sort of indoor positioning), or it be remotely controlled by a user.

The detection step may comprise: detecting a discontinuity in the set of location data, e.g. due to the at least one of the sensor (e.g. image capture) devices having been installed with an incorrect orientation, or due to a device identifier having been incorrectly associated with the at least one sensor (e.g. image capture) device in a device database of the sensor system.

Alternatively or in addition, the detection step may comprise: detecting that part of the location data that corresponds to an untraversable path through the area by comparing the set of location data with a map of the area.

The modifying step may comprise:
physically adjusting the at least one sensor (e.g. image capture) device, and/or
compensating for the error by storing correction data in a memory accessible to the computer system, which identifies the at least one sensor (e.g. image capture) device as having been incorrectly installed, thereby allowing the computer system to correctly extract information from sensor data (e.g. images) captured by the at least one sensor (e.g. image capture) device in spite of the error, and/or
modifying a device database of the sensor system, in which an incorrect device identifier has been stored in association with a location identifier identifying a location and/or an orientation identifier identifying an orientation of the at least one sensor (e.g. image capture) device, to replace the incorrect device identifier with a device identifier correctly identifying the at least one sensor (e.g. image capture) device.

A plurality of device location identifiers may be stored in a device database of the sensor system, each in association with a respective one of the sensor (e.g. image capture) devices and identifying a location of that sensor (e.g. image capture) device, wherein the device location identifiers are used to generate the set of location data.

According to a second aspect of the present invention, a sensor system comprises: a plurality of sensor devices installed so as to capture sensor data from an area whilst at least one entity moves through the area; processing logic configured to process the sensor data to generate a set of location data, which identifies locations traversed by the at least one moving entity; and a path detection module configured to apply a path detection algorithm to the set of location data, so as to detect a discrepancy in the set of location data caused by at least one of the sensor devices having been commissioned incorrectly, thereby identifying the at least one sensor device as having been commissioned incorrectly.

"Processing logic" (e.g. "Image processing logic") means any suitable combination of hardware (localized or distributed) and/or software configured to implement the processing (e.g. image processing).

For example, preferably the (e.g. image) processing logic is formed by a plurality of local processors (e.g. image processors), each local to a respective one of the image capturing devices and configured to process (e.g. image) data captured by that device to generate an individual set of location data identifying locations traversed by the at least one entity within that device's field of view; and the sensor system comprises an aggregation module (for example, implemented by code executed a central processor) configured to aggregate the individual sets to generate the set of location data used to detect the discrepancy.

In embodiments, the path detection module may identify based on the detected discrepancy the at least one sensor (e.g. image capture) device, for example, by automatically storing an identifier of the at least device in a memory of the system, which identifies it as having been incorrectly commissioned and/or by automatically control an output device (e.g. display) of the sensor system to output (e.g. display) to a user of the output device information identifying the at least one sensor (e.g. image capture) device as having been incorrectly commissioned.

The sensor system is preferably embedded in/part of a lighting system comprising a plurality of luminaires. More preferably each luminaire is collocated with a respective one of the sensor (e.g. image capture) devices.

A third aspect of the present invention is directed to a computer program product for detecting commissioning errors in a sensor system, wherein the sensor system comprises a plurality of sensor devices installed so as to cover an area, the computer program product comprising code stored on a computer readable storage medium and configured when executed to implement the following steps: process sensor data captured by the sensor devices from the area, thereby generating a set of location data, which identifies locations within the area traversed by the at least one moving entity; and detecting in the set of location data a discrepancy caused by at least one of the sensor devices having been commissioned incorrectly, thereby identifying the at least one sensor device as having been commissioned incorrectly.

A fourth aspect of the present invention is directed to a method of detecting commissioning errors in a commissioned sensor system, wherein the sensor system comprises a plurality of image capturing devices installed so as to cover an area, the method comprising the following steps: capturing, by the image capturing devices, images of the area whilst at least one entity moves through the area; processing, by a computer system of the sensor system, image data of the images to generate a set of location data, which identifies locations traversed by the at least one moving entity; detecting in the set of location data a discrepancy caused by at least one of the image capturing devices having been incorrectly commissioned; and based on the detecting step, making a modification to the sensor system to compensate for or correct the incorrect commissioning of the at least one image capturing device.

According to a fifth aspect of the present invention, a sensor system comprises: a plurality of image capturing devices installed so as to capture images of an area whilst at least one entity moves through the area; image processing logic configured to process image data of the images to generate a set of location data, which identifies locations traversed by the at least one moving entity; and a path detection module configured to apply a path detection algorithm to the set of location data, so as to detect a discrepancy in the set of location data caused by at least one of the image capturing devices having been commissioned incorrectly.

A sixth aspect of the present invention is directed to a computer program product for detecting commissioning errors in a sensor system, wherein the sensor system comprises a plurality of image capturing devices installed so as to cover an area, the computer program product comprising code stored on a computer readable storage medium and configured when executed to implement the following steps:

process image data of images captured by the image capturing devices, thereby generating a set of location data, which identifies locations within the area traversed by the at least one moving entity; and detecting in the set of location data a discrepancy caused by at least one of the image capturing devices having been commissioned incorrectly.

Note that any feature described in relation to any one of the above aspects can be implemented in embodiments of any other of the above aspects.

BRIEF DESCRIPTION OF FIGURES

For a better understanding of the present invention, and to show how embodiments of the same may be carried into effect, reference is made to the following figures, in which:

FIG. 3A is a plan view of part of a lighting system;

FIG. 9 illustrates how a correctly configured sensor system may be used to implement people counting.

DETAILED DESCRIPTION OF PREFERRED EMBODIMENTS

Embodiments of the present invention provide a vision sensor system. Such a system may a connected lighting system with a vision sensor in each luminaire, or a vision sensor associated to a group of luminaires. A vision sensor, optimized for cost and complexity, can still provide much richer data than a conventional PIR (passive infrared) sensor that is commonly used in lighting systems. For privacy-preservation, each vision sensor does not provide entire images to a central processing unit when operating in real time, but only provides information extracted from those images, in particular location data (and optionally other data such as block pixel information, e.g. presence decisions and/or light levels). This also reduces the amount of memory and communication bandwidth required in the system. The vision sensors have overlapping field-of-views (FoVs) and sensing areas, to prevent gaps in the sensor coverage.

Location data is generated locally by image processors local to the vision sensors, collected centrally from the vision sensors at a central processor (e.g. of a local computer device, such as a local server, or cloud computing platform), and analyzed in terms of trajectories or patterns in a histogram of the data, by a path detection algorithm executed on the central processor and/or manually.

The vision sensor system is a connected lighting system comprising multiple luminaires, the vision sensors and a central processor. The vision sensors are connected to the central processor via a rate-limited communication link via respective local image processors. The central processing unit may be at the same location of the lighting system, or a nearby location, or it may be located in the cloud or some other server of the Internet (for example).

The use of the rate limited communication link is made possible as the image data is not communicational via this link—only the more limited, extracted information (in particular the locally-generated location data) is.

Figure 1:
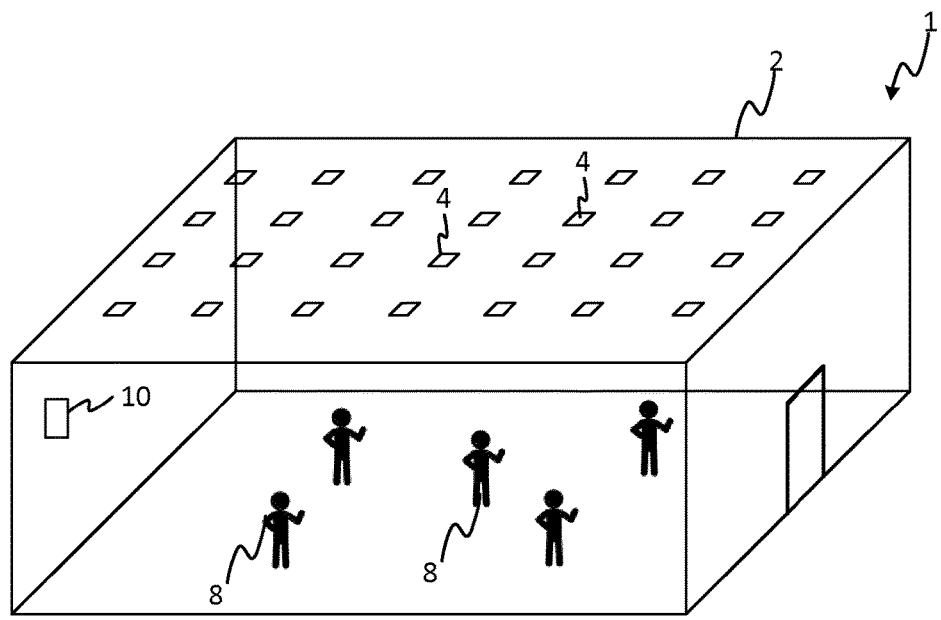
FIG. 1 is a schematic illustration of a lighting system.

FIG. 1 illustrates an exemplary commissioned vision sensor system, in the form of a commissioned lighting system 1. That is, which has already been commissioned.

Although the lighting system 1 has already been commissioned, it has not necessarily been subject to a subsequent dedicated commissioning verification procedure, which is sometimes performed before the system is brought into normal operation with the specific intention of detecting commissioning errors. In this case, the present techniques can be applied to implement a commissioning verification procedure, as in the first embodiment described below.

Alternatively, the commissioned lighting system 1 may already be in operation i.e. "live". In this case, a dedicated commissioning verification procedure may or may not have been performed. That is, not all commissioned lighting systems are necessary subject to dedicated verification before they enter normal operation. In this case, the present techniques can be used to detect commissioning error whilst the system is operational, i.e. performing its intended function, such as people counting, as in the second embodiment described below.

The lighting system 1 comprises a plurality of luminaires 4 installed in an environment 2, arranged to emit light in order to illuminate that environment 2. A gateway 10 is shown, to which each of the luminaires 4 is connected. The gateway 10 effects control of the luminaires 4 within the lighting system 1, and is sometimes referred to as a lighting bridge.

In this example, the environment 2 is an indoor space, such as one or more rooms and/or corridors (or part thereof), or a partially-covered space such as a stadium or gazebo (or part thereof). The luminaires 4 are ceiling-mounted, so as to be able to illuminate the ground (e.g. floor) below them. They are arranged in a grid along two mutually perpendicular directions in the plane of the ceiling, so as to form two substantially parallel rows of luminaires 4, each row being formed by multiple luminaires 4. The rows have an approximately equal spacing, as do the individual luminaires 4 within each row.

Multiple people 8 are shown in the environment, standing on the floor directly below the luminaires 4.

Figure 2:
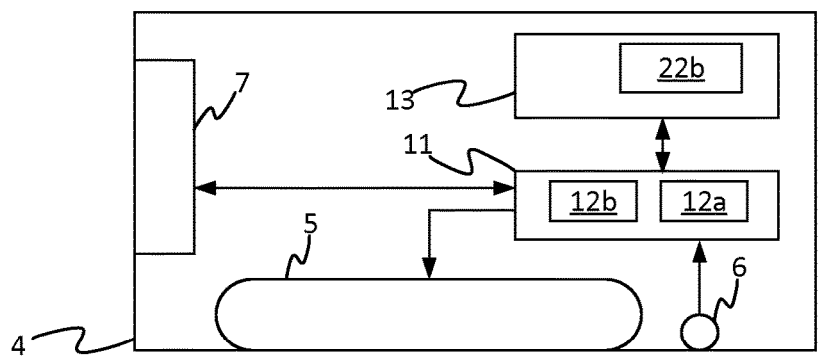
FIG. 2 is a schematic block diagram of a luminaire.

FIG. 2 shows a block diagram of a luminaire 4, representing the individual configuration of each luminaire 4 in the lighting system 1. The luminaire 4 comprises at least one lamp 5 such as an LED-based lamp (one or more LEDs), gas-discharge lamp or filament bulb, plus any associated housing or support. The luminaire 4 also comprises a vision sensor 6 in the form of a camera, which is collocated with the lamp 5; a local processor (formed of one or more processing units, e.g. CPUs, GPUs etc.) 11; a network interface 7, and a local memory 13 (formed of one or more memory units, such as DMA and/or RAM units) connected to the local processor 11. The camera 6 may is able to detect radiation from the luminaires 4 when illuminating the environment, and is preferably a visible light camera. However, the use of a thermal camera is not excluded.

The vision sensor 6 is connected to supply, to the local processor 11, raw image data captured by the vision sensor 6, to which a local person detection algorithm is applied by local image processing code 12a executed on the local processor 11. The local person detection algorithm can operate in a number of ways, examples of which are described in detail below. The local person detection algorithm generates a local presence metric in the form of one or more (individual i.e. local) "entity location identifiers", conveying the location(s) of any detectable entity in the sensors field of view relative to the location of the sensor itself. The entity may be a person or a robot as discussed in detail below. These may, for example, be two or three dimensional location vectors (x,y), (x,y,z) relative to that sensor itself. That is, the individual location vectors may be expressed in different frames of reference, i.e. relative to different spatial origins.

The local processor 11 is connected to the lamp 5, to allow local control code 12b executed on the local processor 11 it to control at least the level of illumination emitted by the lamp 5. Other illumination characteristic(s) such as colour may also be controllable. Where the luminaire 4 comprises multiple lamps 5, these may be individually controllable by the local processor 11, at least to some extent. For example, different coloured lamps 5 may be provided, so that the overall colour balance ban be controlled by separately controlling their individual illumination levels.

The network interface 7 may be a wireless (e.g. ZigBee, Wi-Fi, Bluetooth) or wired (e.g. Ethernet) network interface, and provides network connectivity, whereby the luminaires 4 in the lighting system 4 are able to form a lighting network and thereby connect to the gateway 10. The network can have any suitable network topology, for example a mesh topology, star topology or any other suitable topology that allows signals to be transmitted and received between each luminaire 4 and the gateway 10. The network interface 7 is connected to local processor 11, so as to allow the local processor 11 to receive external control signals via the network. These control the operation of the local control code 12a, and thereby allow the illumination of the lamp 5 to be controlled externally. This connection also allows the local processor 11 to transmit images captured by the vision sensor 6, to which the image quantization has been applied by the local image processing code 12a, to an external destination via the network.

Figure 3:
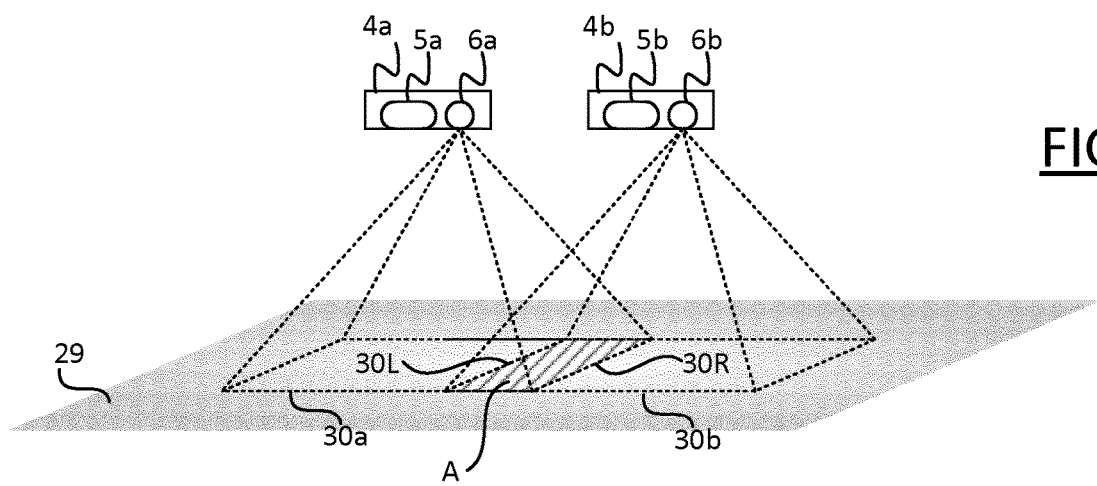
FIG. 3 is a perspective view of a pair of adjacent luminaires.

FIG. 3 shows a perspective view of a first and a second of the luminaires (4a, 4b), comprising first and second light sources 5a, 5b and first and second vision sensors 6a, 6b, as described above. The first and second luminaires 4a, 4b are neighbouring luminaires i.e. adjacent one another in the grid, along one of the directions of the grid or along one of the diagonals of the grid.

The respective lamp 5a, 5b of each of the luminaires 4a, 4b is arranged to emit illumination towards a surface 29 (the floor in this example), thereby illuminating the surface 29 below the luminaires 4. As well as laminating the environment, the illumination provided by the luminaires 4 renders the people 8 detectable by the vision sensors 6.

The respective vision sensor 6a, 6b of each luminaire 4a, 4b has a limited field of view. The field of view defines a volume of space, marked by dotted lines in FIG. 4, within which visible structure is detectable by that vision sensor 6a, 6b. Each vision sensor 6a, 6b is positioned to capture images of the respective portion (i.e. area) 30a, 30b of the surface 29 that is within its field of view ("sensing area"), directly below its respective luminaire 4a, 4b. As can be seen in FIG. 3, the fields of view of the first and second vision sensors 4a, 4b overlap in the sense that there is a region of space within which structure is detectable by both vision sensors 6a, 6b. As a result, one of the borders 30R of the sensing area 30a of the first sensor 6a is within the sensor area 30b of the second sensor 6b ("second sensing area"). Likewise, one of the borders 30L of the sensor area 32b of the second sensor 6b is within the sensor area 30a of the first sensor 6a ("first sensing area"). An area A is shown, being the intersection of the first and second sensor areas 30a, 30b. The area A is the part of the surface 29 that is visible to both of the first and second sensors 6a, 6b ("sensor overlap").

FIG. 3A shows a plan view of a part of the lighting system 1, in which a 3×3 gird of nine luminaires 4a, . . . , 4h is shown, each having a respective sensor area 30a, . . . , 30h, which is the sensor area of its respective vision sensor as described above. The sensing area of each luminaire overlaps with that of each of its neighbouring luminaires, in both directions along the gird and both directions diagonal to the grid, as shown. Thus every pair of neighbouring luminaires (4a, 4b), (4a, 4c), (4a, 4d), (4b, 4c), . . . has an overlapping sensor area. The overlapping FoVs/sensing areas of the vision sensors ensure that there are no dead sensing regions.

Although nine luminaires are shown in FIG. 3A, the present techniques can be applied to lighting systems with fewer or more luminaires.

Figure 4:
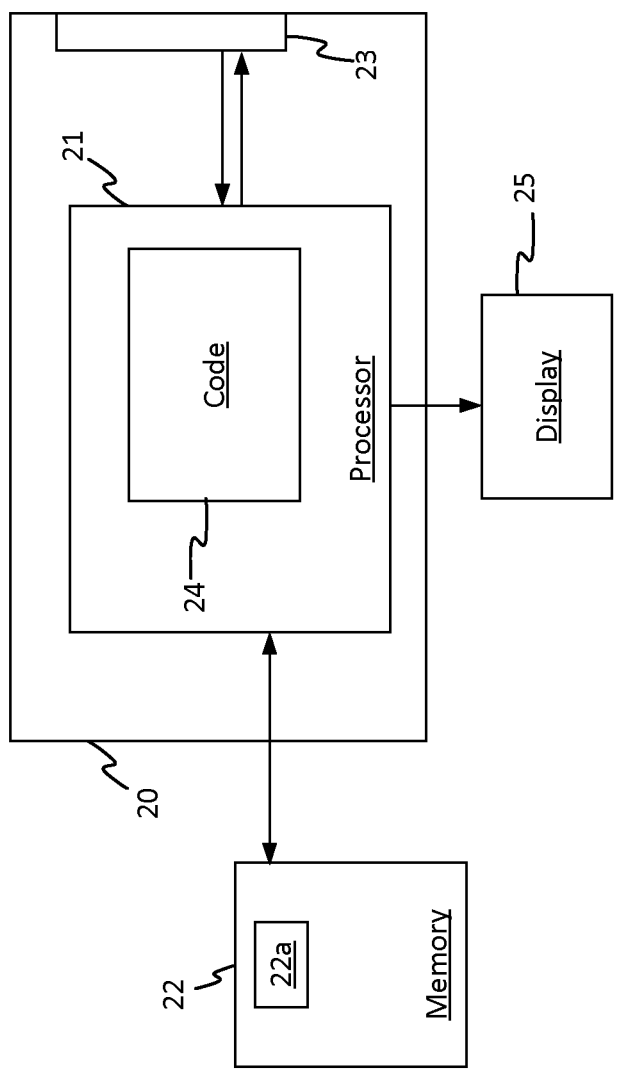
FIG. 4 is a schematic block diagram of a central processing unit for operating a lighting system.

FIG. 4 shows a block diagram of a central processing unit 20. The central processing unit is a computer device 20, such as a server (e.g. a local server, or part of a cloud), for operating the lighting system 1. The central processing unit 20 comprises a processor 21 (central processor), formed of e.g. one or more CPUs; and a network interface 23. The network interface 22 is connected to the central processor 21. The central processing unit 21 has access to a memory, formed of one or more memory devices, such as DMA and/or RAM devices. The memory 22 may be external or internal to the computer 20, or a combination of both (i.e. the memory 22 can, in some cases, denote a combination of internal and external memory devices), and in the latter case may be local or remote (i.e. accessed via a network). The processor 20 is connected to a display 25, which may for example be integrated in the computer device 20 or an external display.

The processor 21 is shown executing lighting system management code 24 (more generally, sensor management code). Among other things, the lighting management applies an aggregation algorithm, to aggregate multiple entity location identifiers received from different luminaires 4 so as to generate an (aggregate) set of location data covering the whole area covered by the sensors.

The network interface 23 can be a wired (e.g. Ethernet, USB, FireWire) or wireless (e.g. Wi-Fi, Bluetooth) network interface, and allows the central processing unit 20 to connect to the gateway 10 of the lighting system 1. The gateway 10 operates as an interface between the central processing unit 20 and the lighting network, and thus allows the central processing unit 20 to communication with each of the luminaires 4 via the lighting network. In particular, this allows the central processing unit 20 to transmit control signals to each of the luminaires 4 and receive images from each of the luminaires 4. The gateway 10 provides any necessary protocol conversion to allow communication between the central processing unit 20 and the lighting network.

Note that FIGS. 2 and 4 are both highly schematic. In particular, the arrows denote high-level interactions between components of the luminaire 4 and central computer 20 and do not denote any specific configuration of local or physical connections.

Figure 4A:
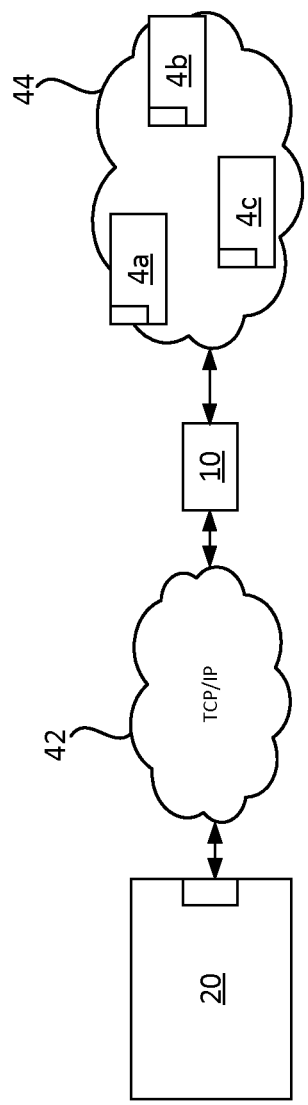
FIG. 4A is a schematic block diagram illustrating an exemplary control architecture of a lighting system.

FIG. 4A shows an exemplary lighting system control architecture, in which the central processing unit 20 is connected to the gateway 10 via a packet basic network 42, which is a TCP/IP network in this example. The central processing unit 20 communicates with the gateway 10 via the packet based network 42 using TCP/IP protocols, which may for example be effected at the link layer using Ethernet protocols, Wi-Fi protocols, or a combination of both. The network 42 may for example be a local area network (business or home network), the Internet, or simply a direct wired (e.g. Ethernet) or wireless (e.g. Wi-Fi) connection between the central processing unit 20 and the gateway 10. The lighting network 44 is a ZigBee network in this example, in which the luminaires 4a, 4b, 4c, . . . communicate with the gateway 10 using ZigBee protocols. The gateway 10 performs protocol conversion between TCP/IP and ZigBee protocols, so that the central computer 20 can communicate with the luminaires 4a, 4b, 4c via the packet based network 42, the gateway 10 and the lighting network 44.

Note that this is exemplary, and there are many ways of effecting communication between the central computer 20 and the luminaires 4. For example communication between the computer 20 and gateway 10 may be via some other protocol, such as Bluetooth, or via some other a direct connection such as USB, FireWire or bespoke connection.

The memory 22 stores a device database 22a. The database 22a contains a respective identifier (ID) of each vision sensor 6 (or each luminaire 4) in the lighting system 1, which uniquely identifies that vision sensor 6 within the lighting system 1, and an associated device location identifier of that vision sensor 6; for example, a two dimensional (x,y) or three dimensional location identifier (x,y,z) (e.g. if the vision sensors are installed at different heights). The location identifier may convey only relatively basic location information, such as a grid reference denoting the position of the corresponding luminaire in the grid—e.g. (m,n) for the mth luminaire in the nth row, or it may convey a more accurate location of the vision sensor 6 (or luminaire 4) itself, e.g. in meters or feet to any desired accuracy. The IDs of luminaires/vision sensors, and their locations, are thus known to the central processing unit 20.

The database 22a has been populated during the commission phase of the lighting system 1. For example, during the commissioning phase, the device location identifiers identifying locations of the image capturing devices may be assigned to the image capturing devices manually i.e. associated with device identifiers of the image capturing devices themselves in the database 22a.

For example, during the commissioning phase of the sensor system, device location identifiers identifying locations of the image capturing devices may be assigned to the image capturing devices i.e. associated with device identifiers of the image capturing devices themselves in the database 22a. The images themselves convey locations relative to the capturing device, which can be converted to a common reference frame using the device location identifiers. That is, spatial (translational and/or rotational) transformation(s) can be applied to at least some of the individual location vectors using the device location identifiers, such that the transformed vectors are in the same frame of reference i.e. relative to a common origin.

Figure 5:
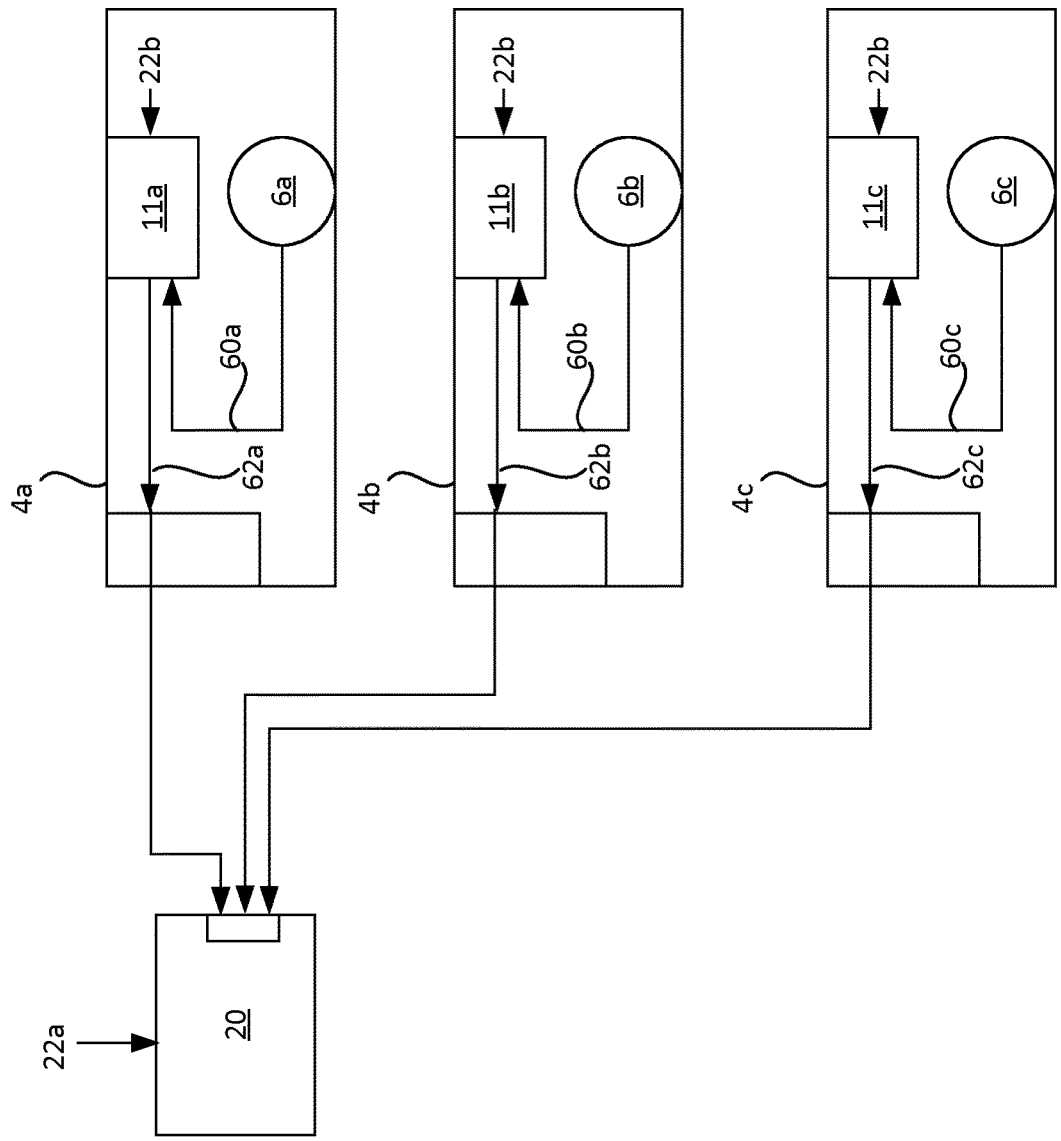
FIG. 5 illustrates how local image processors cooperate with a central processing unit to provide a people counting function.

FIG. 5 illustrates how the central processor 20 and the luminaires 4 cooperate within the system 1. First, second and third luminaires 4a, 4b, 4c are shown, though this is purely exemplary.

The vision sensors 6a, 6b, 6c of each luminaire captures at least one image 60a, 60b, 60c of its respective sensing area. The local processor 11a, 11b, 11c of that luminaire applies the local person detection algorithm to that image(s). That is, the local person detection algorithm is applied separately at each of the luminaires 4a, 4b, 4c, in parallel to generate a respective local presence metric 62a, 62b, 62c. Each of the local presence metrics 62a, 62b, 62c is transmitted to the central processing unit 20 via the networks 42, 42 and gateway 10. The images 60a, 60b, 60c themselves are not transmitted to the central processing unit 20. In some cases, sensor overlap metadata 22b is used locally at the luminaires 4a, 4b, 4c to generate the local presence metrics; alternatively or in addition, such information could be used at the central computer 20, although neither are essential as if necessary any overlapping FoVs can be detected from the location data itself (see below).

Figure 6:
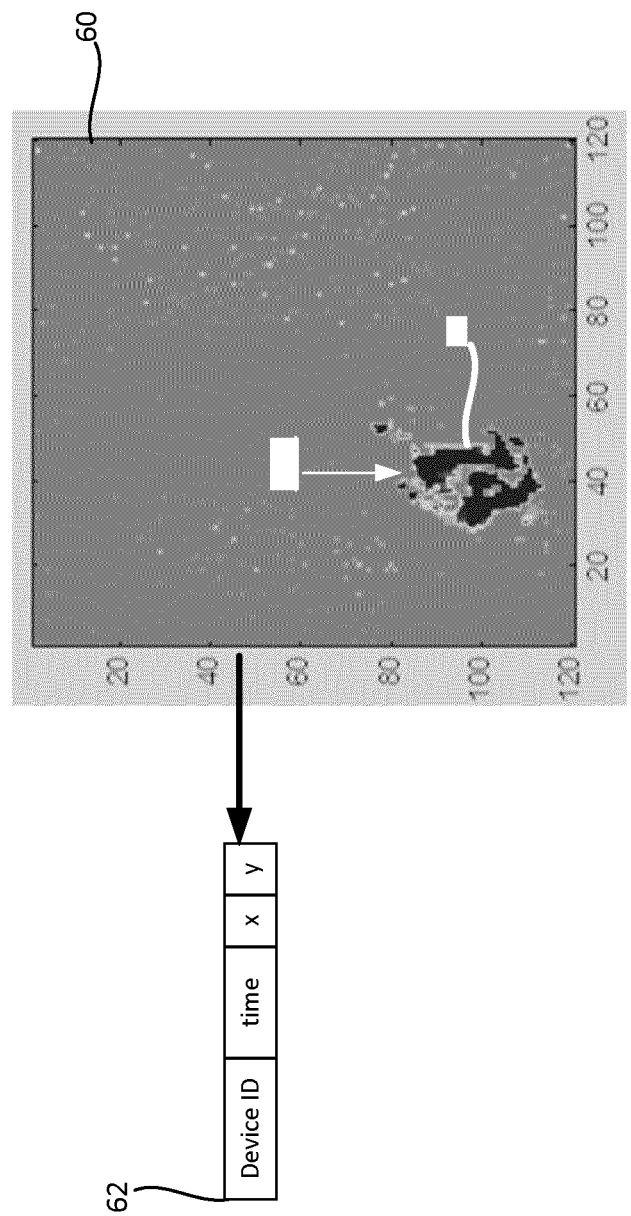
FIG. 6 shows an exemplary image captured by a vision sensor, which can be used to generate individual location data in the form of one or more person location identifiers.

FIG. 6 shows an exemplary image 60 captured by the vision sensor 6a of the first luminaire 4a.

In this example, a single entity 61 is detectable in the image 60. In this example the entity 61 is a person, though it could alternatively be a robot and all description pertaining to a person applies equally to a robot in that case.

As discussed, the vision sensor 6a captures images of the part of the surface 29 directly below it, so the image 60 is a top-down view of the person 61, whereby the top of their head and shoulders are visible. Note that, in the case that the person 61 is in the sensor overlap area A, they would be similarly detectable in an image captured by the second luminaire 4b. That is the same person 61 would be simultaneously visible in images from both the first and second luminaires 4a, 4b, at different respective locations in those images.

Each vision sensor 6 communicates relative location with respect to the same vision sensor of occupants, along with its ID and a time stamp, to the central processing unit 20, for example as a presence metric in the form of a location vector.

An example is illustrates in FIG. 6, which shows how a single location vector 62 (x,y) is generated denoting the location of the single person 61 relative to the first vision sensor 6a that captures the image 60, and associated with a corresponding timestamp denoting at least approximately the time at which that person 61 was at that location (x,y) and the sensor identifier of the sensor that captured the image.

The central processing unit 20 collects such location vectors from the multiple vision sensors. The central unit 20 has knowledge of the location of the location of each vision sensor from the database 22a and therefore can translate the relative location of each occupant within each vision sensor into a common frame of reference i.e. relative to a common spatial origin, for example over a desired interval of time, by applying a suitable spatial transformation, in particular a translational transformation (that is, a translation in the mathematical sense), to them using the device location identifier in the database 22a. The transformed location vectors collected from multiple visions sensors constitute a set of aggregate location data for that interval of time.

From the transformed location vectors, it is possible to determine a path traversed by the person 61 as they move through the area covered by the sensors, though the sensing areas of multiple vision sensors.

Examples of this are illustrated in FIGS. 7A-7D. The transformed vectors (denoted 62'), collected over time from the local image processors 11, are represented by points in these figures, and the sensor areas of the vision sensors are shown to aid illustration.

Figure 7A:
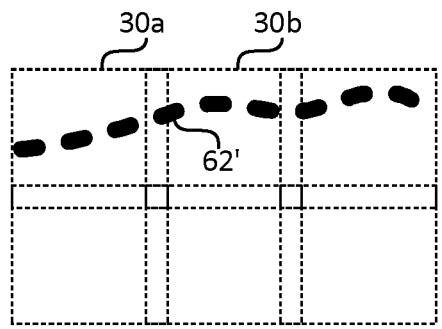
FIG. 7A illustrates a set of location data generated by a correctly configured sensor system.

FIG. 7A illustrates an example of location data generated when the sensor system 1 is correctly configured i.e. no commissioning errors. In this case, it can be that the transformed location vectors 62', collected over time as the person 61 moves though the area, convey a substantially continuous, i.e. unbroken, path reflecting the actual path followed by the person 61, as intended.

Figure 7B:
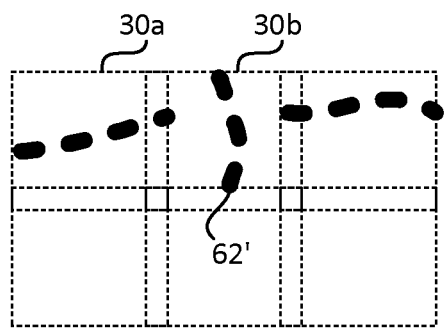
FIG. 7B illustrates a set of location data generated by a sensor system in which a vision sensor has been incorrectly orientated, causing a first type of internal discrepancy in the set of location data.
Figure 7C:
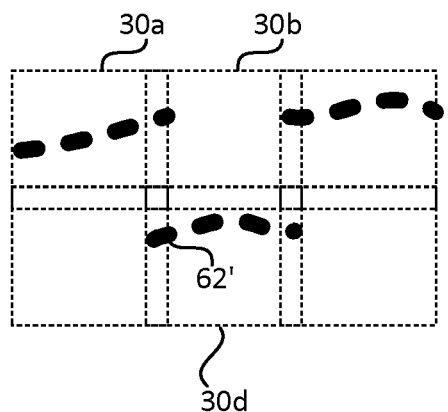
FIG. 7C illustrates a set of location data generated by a sensor system in which a location data has been incorrectly recorded for a vision sensor, causing a second of type of internal discrepancy in the set of location data.
Figure 7D:
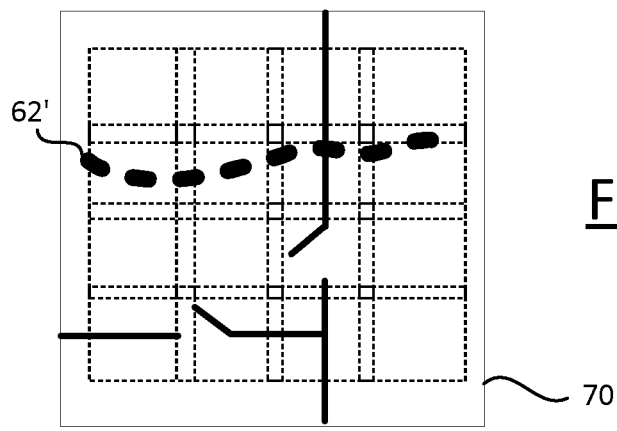
FIG. 7D illustrates a set of location data generated by a sensor system in which location data has been incorrectly recorded for an entire row of sensors in a sensor grid, causing a discrepancy between the location data and the physical layout of the area covered by the sensors.

By contrast, FIGS. 7B-7D show how various types of discrepancy can arise in the transformed location vectors 62' can arise due to commissioning errors in the lighting system 1. That is, a discrepancy between the path indicated by the transformed location vectors 62' and an expected path (i.e. the actual, physical path) traversed by the person 62' though the area.

This could be an "internal" discrepancy within the aggregate set of location data. That is, a discrepancy between parts of the location data itself, such as a discontinuity in the path conveyed by the transformed location vectors 62'. Such a discontinuity can arise, for example, where one of the image capturing devices is oriented incorrectly, as illustrated in FIG. 7B. In this example, it can be seen that the orientation error propagates into the local location vectors 62 generated by the second vision sensor 6b, corresponding to locations in its sensing area 30b, and thus into the transformed versions of those vectors.

As another example, where the locations traversed by the entity are determined using the pre-stored device location information in the database 20a, such a discontinuity can arise if there are errors in the pre-stored location information in the database 22a. That is, if the database 22a has been populated incorrectly during commissioning. In the example of FIG. 7C, although the locally-generated location vectors relative to (in this example) the second vision sensor 6b are correct, the location of the second vision sensor has been incorrectly recoded in the database 22a during commissioning; specifically the location associated with the second vision sensor 6b in the database 22a is in fact the location of the fourth vision sensor 6d. This database error propagates into the transformed location vectors 62' for the second sensor 30b when the spatial transformation is applied to the individual location vectors form the second sensor 30b, as illustrated in FIG. 7C.

Internal discrepancies of either kind can be detected manually, for example by displaying the transformed location vectors 62' as points on a two dimensional plane on the display 25 to a user so that the user can detect the discrepancy themselves, or automatically by a suitable path detection algorithm executed on the processor 21 and applied to the received local location vectors 62.

Alternatively, this could be an "external" discrepancy, as in FIG. 7D. That is, even if the set of location data is internally consistent with no apparent discontinuities, it may conflict with the physical reality of the area. External discrepancies can be detected by comparing the transformed location vectors 62' with a map 70 of the area covered by the sensors 6, such as a floorplan. For example, where the location data conveys an apparent path that passes through a wall, as in the example of FIG. 7D, or is otherwise untraversable in reality. The comparison can be manual, or automatic in which case electronically stored map data is compared with the set of location data by the path detection algorithm.

The vision sensing system with the various information elements involved are depicted in FIG. 1.

Figure 8A:
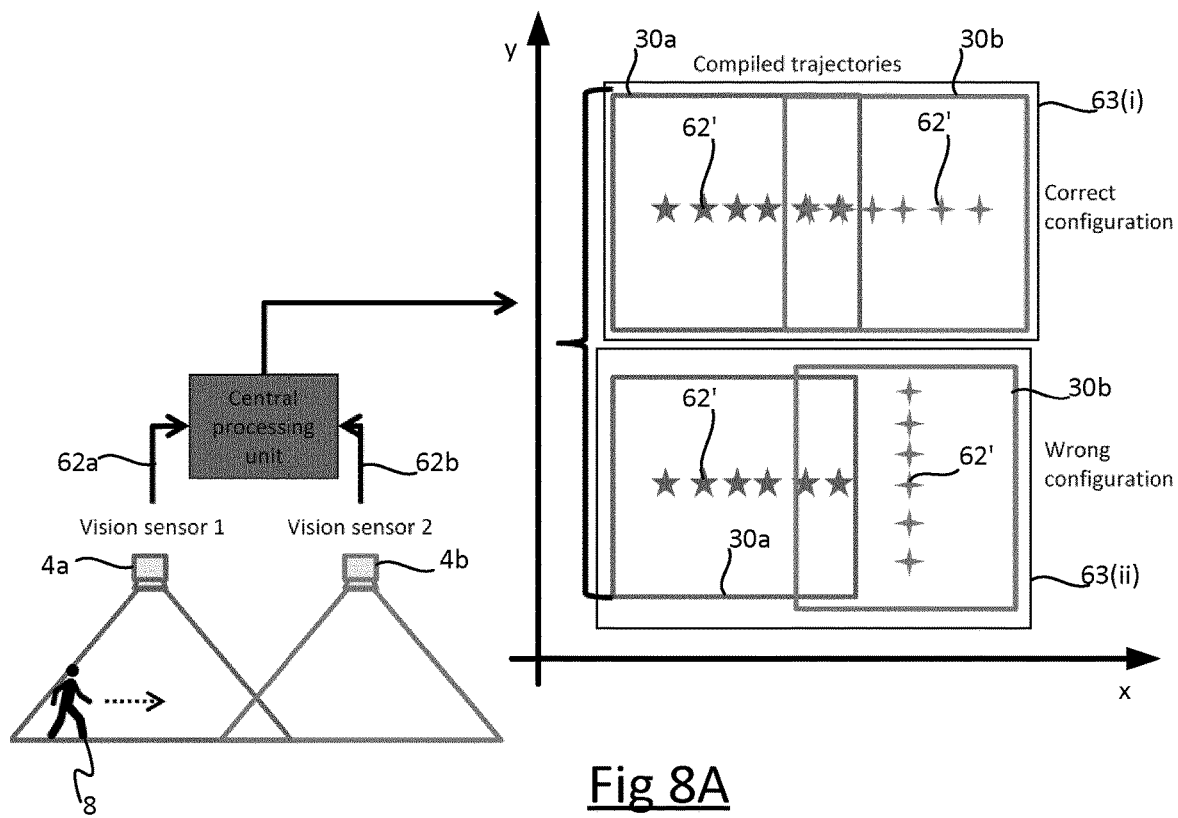
FIG. 8A illustrates a process for detecting discrepancies in a set of location data generated by a sensor system based on motion of a single user or robot, as part of a dedicated commissioning verification procedure.

FIG. 8A illustrates a first embodiment of the present invention.

In the first embodiment, each vision sensor communicates to the central processing unit 20: the location of each person 8, along with the vision sensor ID and a time stamp/counter. The location of each person 8 may for instance be with respect to the vision sensor 6 and so the central processing unit 20 converts the locations to a global reference. Alternately, a robot follows a defined trajectory, in a configuration detectable by the vision sensors 6. The robot may, for example, determine its own path automatically, e.g. following beacons, internal accelerometers, or some sort of indoor positioning. Alternatively, the robot may be remotely controlled by a user from e.g. a control room, using a remote control mechanism.

A commissioner performs a walk test, for example during a dedicated commissioning verification procedure, i.e. he/she walks across the room following a pre-defined trajectory when no other person 8 is present at the space.

The central processing unit 22 receives and collects all the locations 62 reported from each vision sensor 6 and compiles them into a path ("trajectory") over the xy-plane of the area covered by the sensors 6.

This trajectory information is either displayed to the commissioner on the display 25, or analyzed by a path detection algorithm executed on the processor 21 in order to detect any discrepancies between the reported and expected trajectories.

As discussed, the discrepancy may indicate misconfiguration or other commissioning errors, e.g. wrong ID assigned to vision sensors in the database 22a, a sensor(s) being wrongly location and/or orientated during installation.

In FIG. 8A, an example is shown where a first compiled trajectory 63(i) follows the expected trajectory, due to the vision system 1 being configured correctly. By contrast, a second compiled trajectory 63(ii) is shown, in which the second vision sensor 6b has been installed with the wrong orientation, as in the example of FIG. 7B.

Figure 8B:
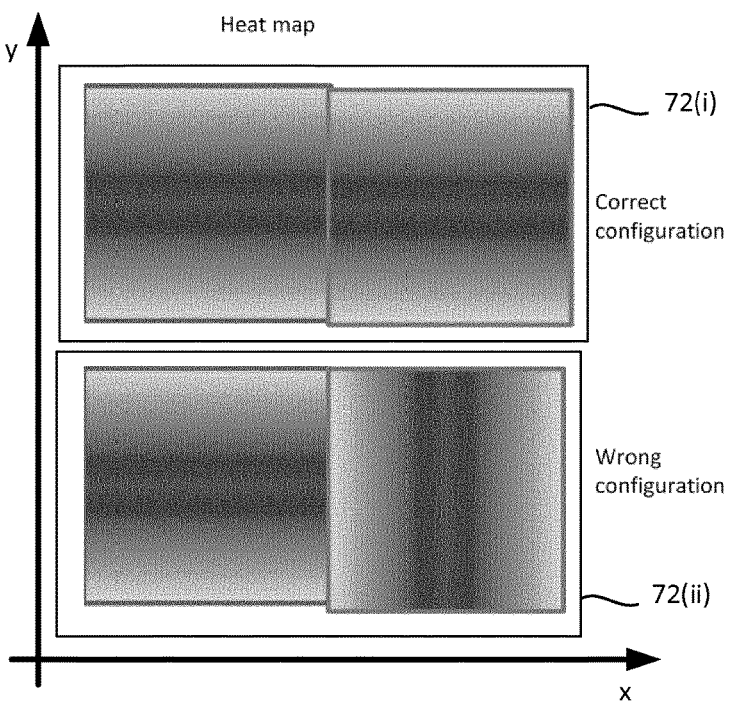
FIG. 8B illustrates a process for detecting discrepancy in a set of location data collected over a long interval of time whilst the sensor system is in operation, based on sensing motion of multiple people passing through the area covered by the sensors.

FIG. 8B illustrates a second embodiment of the present invention.

In the second embodiment, each vision sensor 6 communicates to the central processing unit 20 the location of each person 8 (such as the person 62 in the exemplary image 60), along with the vision sensor ID and a time stamp (such as a counter, or other timestamp). The location of each person 8 may for instance be with respect to that vision sensor 6 and so the central processing unit converts the locations to a global reference. Additionally, the vision sensor 6 (that is, the local image processor 11 connected to that sensor 6) may report the size of motion of each detected person 8, for example as a speed value or velocity vector determined over two or more images.

The central processing unit 20 collects the location information 62 from all the vision sensors 6 over a long duration of time (e.g. one or more days). The central processing unit builds a distribution of locations that correspond to motion (e.g. having a speed (scalar) or velocity (vector)) above a certain threshold.

These values can, for example, be displayed on the display 25 in the form of a "heat map" as illustrated in FIG. 8B, in which first and second heat maps 72(i), 72(ii) are shown.

To generate the heat map 72(i)/72(ii), the area covered by the sensors is subdivided into, say, a grid of sub regions. The sub regions can, for example, be very small (e.g. corresponding to individual pixels or a small number of vison sensor pixels) such that each sub region is effectively a point within the area. Each sub-region is associated with a value generated for that area, which is stored in the memory 22. They are referred to herein as frequency values because each conveys the relative frequency at which that sub region has been traversed. However, the frequency values need not be frequencies as such—for example, each frequency value may be a count of people who have traversed that sub region.

Different frequency values are then represented in the displayed heat map 72(i)/72(ii) using different colours (e.g. different chrominance and/or luminance), and/or intensities, and/or shading, as shown in FIG. 8B. In FIG. 8B, darker intensities denote more frequently traversed locations than lighter intensities. From the heat map, it is possible for an administrator to deduce the most frequently traversed paths though the area intuitively, and also for them to detect and discrepancies.

The administrator or a path detection algorithm executed on the processor 21 analyzes the relative frequencies for locations in the heat-map to detect a discrepancy between the heat-map of locations and expected valid locations. An invalid trajectory of locations may indicate an error in the configuration. As an example of invalid trajectories due to errors in the configuration: trajectories that cross through a wall (as in FIG. 7D), discontinuities in trajectories between adjacent vision sensors (as in FIGS. 7B and 7C). In FIG. 8B, the first heat-map 72(i) corresponds to a correct configuration of the vision system, whereas the second heat map 72(ii) reflects an orientation error of the second vision sensor 72(ii). That is, the second heat map 72(ii) reflects a situation in which a vision sensor has been installed with the wrong orientation.

A heat map is just one example of a suitable of visual representation. For example, another type of visual representation is displaying only those locations that have been traversed with relative frequencies above a threshold (e.g. for more than 50% of the time interval).

The size of motion may be reported from the vision sensor 6, or the central processing unit 20 may calculate the size of motion based on consecutive reported locations of each person 8.

In either of the above embodiments, the path detection algorithm may for example compute a probability of a transition between regions can be used to detect discrepancy in the spatial and/or temporal continuity of trajectories, in order to automatically detect internal discrepancies in the aggregate location data 62'.

Note, in the above-described embodiments, the images 60 themselves are not communicated to, or used by, the central processing unit 20 in the above-described processes—only the location data 62 extracted from the images, by the local processors 11 processing the images, is communicated to the central processing unit 20. This uses less bandwidth and, in the second embodiment wherein the process is performed when the sensor system is in use, preserves privacy for the people in the space. That is, discrepancies are not detected from the images 60 directly, but only from the location data 62 extracted from those images.

As indicated above, the sensor overlap A can if necessary be identified from the location vectors themselves: for any people in sensor overlap areas, two or more of the local location vectors will correspond to the same location relative to the common origin and the same time (to within respective radius and time thresholds). This can be detected by the code 24 executed central processing unit 20, such that multiple location vectors from different sensors 6 corresponding to the same physical location are only accounted for once in detecting the path traversed by the person/people/robot. Alternatively, the overlap can be detected manually by a user when the locations are displayed on the display 25.

Once commissioning errors have been detected, they can be corrected or compensated for in a variety of ways. For example, an incorrectly orientated sensor can be physically adjusted, or alternatively it can be compensated for by reconfiguring the software of the vision sensor system 1 e.g. so that, when executed on one of the local processors 11 or the central processor 21, the software is configured to apply a rotational transformation to the images captured by that sensor (at the relevant local processor 11) or to the location vectors extracted from those images to account for the incorrect physical orientation (at the relevant local processor, or at the central processor 21). Where the error is an error in the database 22a, it can be corrected by correcting the information in the database 22a. As another example, in addition to recording the locations of the sensors 6 in the database 22a, additionally their orientation could be recorded, and used to generate the transformed location vectors 62', in this case by applying both a translational transformation and (where necessary) a rotational transformation to the images and/or the extracted information. As will be apparent, in this case an incorrect recording of the orientation in the database 22a will lead to the type of discrepancy shown in FIG. 7B. Once detected, this can for example be corrected by correcting the orientation information in the database 22a.

In a number of applications, the count of people over a particular area is required. People counting information may be used to enable applications such as space optimization, planning and maintenance, HVAC (heating, ventilation and air conditioning) control, and data analytics driven marketing. For example, in marketing analysis, people count is needed as one of the input data for analysis. For space optimization, a count of people in (pseudo) real time is needed to identify temporal and spatial usage patterns. Configuration errors can lead to incorrect people counts, which in turn disrupt the processes that rely on an accurate people count.

Once commissioning errors have been detected and rectified in accordance with the above techniques, the system 1 can be used to provide an accurate people count 66 using the location identifiers 62 generated by the local image processors 11 whilst the system is in use (see FIG. 9).

Whilst the above has been described with reference to sensor devices that are image capturing devices, the sensor devices can take other forms such as e.g. radar, sonar, or ultrasound devices, which generate sensor data in the form of radar data, sonar data and ultrasound data respectively; or any other a sensor that can detect and provide location information, i.e. which can generate sensor data that can be processed to detect and localize entities (robots, people, other objects etc.). All description pertaining to an "image capturing device" or "image data" applies equally to such other types of sensor device and sensor data respectively. For example, the sensor system may comprise a plurality of multi-modality sensors devices. That is, a combination of two or more of these (or other) types of sensor Whilst the above has been described with reference to an indoor lighting system, with ceiling mounted luminaires arranged in a grid, as will be apparent the techniques can be applied in general to any lighting system (indoor, outdoor or a combination of both), in which vision sensors are deployed. For example, in an outdoor space such as a park or garden. Whilst it can be convenient to collocate the sensors with the luminaires for reasons discussed, this is by no means essential, nor is there any need to have the same number of luminaires and sensors. Moreover, the techniques need not be applied in a lighting system at all.

Moreover, it should be noted for the avoidance of doubt that the above-described architecture is exemplary. For example, the techniques of this disclosure can be implemented in a more distributed fashion, e.g. without the gateway 10 or central processing unit 20. In this case, the functionality of the central processing unit 20 as described above may be implemented by the local processor 13 attached to one of the vision sensors 6 (which may or may not be collocated with a luminaire 4 in general), or distributed across multiple local processors 13.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of detecting installation errors in a commissioned sensor system, wherein the sensor system comprises a plurality of sensor devices installed so as to cover an area, the method comprising the following steps:
   capturing, by the sensor devices, sensor data pertaining to the locations of at least one entity whilst said at least one entity moves through the area; and wherein said entity does not possess a sensor device, nor have a device capable of communicating with any component of the sensor system;
   processing, by a computer system of the sensor system the sensor data from at least two sensor devices to generate an individual set of location data for each sensor, which identifies a path of locations traversed by the at least one moving entity;
   detecting a discontinuity in the path caused by at least one of the sensor devices having been incorrectly installed by comparing the at least two individual sets of location data;
   based on the detecting step, making a modification to the sensor system to compensate for or correct the incorrect installation of the at least one sensor device; and,
   wherein the sensor devices are image capturing devices, wherein the sensor data from which the location data is generated is image data captured from the area by the image capturing devices whilst the at least one entity moves through the area.

2. A method according to claim 1, wherein the detecting step is performed by the computer system applying a path detection algorithm to the individual sets of location data.

3. A method according to claim 1, comprising:
   controlling, by the computer system, a display to display to a user a visual representation of the individual sets of location data, wherein the detecting step is performed by the user, using the displayed representation.

4. A method according to claim 1, wherein the sensor data from the area are captured over an interval of time during which multiple people move through the area, wherein the individual sets of location data identifies locations in the area traversed by the people.

5. A method according to claim 4 comprising:
   generating, by the computer system, for each of a plurality of the locations traversed by the people, an associated value that conveys a relative frequency at which that location has been traversed in the time interval, wherein the frequency values are used to detect the discrepancy.

6. A method according to claim 3, wherein the visual representation visually conveys to the user information about the frequency values associated with the plurality of locations.

7. A method according to claim 1, wherein the at least one entity is a user or a robot.

8. A method according to claim 1 comprising:
   processing, by each of a plurality of local processors of the computer system, each of which is local to a respective one of the sensor devices, sensor data captured by that device to generate an individual set of location data identifying locations traversed by the at least one entity within that device's field of view, wherein the field of view is a volume of space from which the sensor is able to generate sensor data; and
   communicating, by each local processor, its individual set of location data to a central processor of the computer system, wherein the sensor data used to generate that individual set is not communicated to the central processor, wherein the central processor aggregates the individual sets of location data received from the local processors to generate a combined set of location data used to detect the discrepancy.

9. A method according to claim 8, wherein the detection step comprises:
   detecting a discontinuity in the combined set of location data, and/or
   detecting that part of the location data corresponds to an untraversable path through the area by comparing the combined set of location data with a map of the area.

10. A method according to claim 1, wherein the modifying step comprises:
    physically adjusting the at least one sensor device.

11. A method according to claim 1, wherein a plurality of device location identifiers is stored in a device database of the sensor system, each in association with a respective one of the sensor devices and identifying a location of that sensor device, wherein the device location identifiers are used to generate a combined set of location data.

12. A sensor system comprising:
- a plurality of sensor devices installed so as to capture sensor data from an area whilst at least one entity moves through the area; wherein said entity does not possess a sensor device, nor have a device capable of communicating with any component of the sensor system;
- processing logic configured to process the sensor data to generate from at least two sensor devices an individual set of location data for each sensor, which identifies locations traversed by the at least one moving entity;
- a path detection module configured to apply a path detection algorithm to the individual sets of location data, to enable a comparison of the individual sets so as to detect a discontinuity in the paths caused by at least one of the sensor devices having been installed incorrectly, thereby identifying the at least one sensor device as having been installed incorrectly; and,
- wherein the sensor devices are image capturing devices, wherein the sensor data from which the location data is generated is image data captured from the area by the image capturing devices whilst the at least one entity moves through the area.

13. A computer program product comprising code stored on a non-transitory computer readable storage medium and configured when executed to implement the following steps:
- process sensor data captured by at least two installed sensor devices from an area, thereby generating an individual set of location data for each sensor, which identifies a path of locations within the area traversed by at least one moving entity; wherein said entity does not have a device capable of communicating with any component of the sensor system; and
- detecting a discontinuity in the path caused by at least one of the sensor devices having been commissioned installed incorrectly by comparing the at least two individual sets of location data, thereby identifying the at least one sensor device as having been installed incorrectly; and,
- wherein the sensor devices are image capturing devices, wherein the sensor data from which the location data is generated is image data captured from the area by the image capturing devices whilst the at least one entity moves through the area.

14. A method according to claim 1, wherein the modifying step comprises:
- compensating for the error by storing correction data in a memory accessible to the computer system, which identifies the at least one sensor device as having been incorrectly installed, thereby allowing the computer system to correctly extract information from sensor data captured by the at least one sensor device in spite of the error, and/or
- modifying a device database of the sensor system, in which an incorrect device identifier has been stored in association with a location identifier identifying a location and/or an orientation identifier identifying an orientation of the at least one sensor device, to replace the incorrect device identifier with a device identifier correctly identifying the at least one sensor device.

15. The sensor system of claim 12 wherein at least one of the sensor devices is a visible-light camera.

16. A method according to claim 2, wherein the path detection algorithm comprises computing a probability of a transition between the locations traversed.

* * * * *